United States Patent [19]

Wagensonner et al.

[11] 4,034,247

[45] July 5, 1977

[54] STRUCTURE FOR SYNCHRONOUS MOTOR, ESPECIALLY STEPPER MOTOR

[75] Inventors: Eduard Wagensonner, Aschheim; Herbert Wilsch, Unterhaching, both of Germany

[73] Assignee: AGFA-Gevaert, Aktiengesellschaft, Leverkusen, Germany

[22] Filed: Oct. 28, 1975

[21] Appl. No.: 626,208

[30] Foreign Application Priority Data

Oct. 31, 1974 Germany .......................... 2451876

[52] U.S. Cl. .............................. 310/164; 310/49 R
[51] Int. Cl.² ........................................ H02K 19/00
[58] Field of Search ............ 310/162, 163, 164, 49, 310/112, 42, 89, 114, 254

[56] References Cited

UNITED STATES PATENTS

| | | | |
|---|---|---|---|
| 3,092,743 | 6/1963 | Van Uutt ........................... | 310/164 |
| 3,219,862 | 11/1965 | Kieffert ............................. | 310/162 |
| 3,234,418 | 2/1966 | Tomaro ............................. | 310/164 |
| 3,416,017 | 12/1968 | Krug ................................. | 310/164 |
| 3,633,055 | 1/1972 | Maier ................................ | 310/162 |
| 3,671,841 | 6/1972 | Hoffmann ........................ | 310/49 |
| 3,684,907 | 8/1972 | Hinachi ............................ | 310/164 |
| 3,693,034 | 9/1972 | Inariba ............................. | 310/49 |
| Re. 28,075 | 7/1974 | Kavanaugh ...................... | 310/46 |

*Primary Examiner*—R. Skudy
*Attorney, Agent, or Firm*—Michael J. Striker

[57] ABSTRACT

The motor is comprised of two stators arranged coaxially. Each stator is formed of a first pole teeth plate and a second pole teeth plate interdigitated with each other. The first plates are arranged back-to-back and angularly offset relative to each other by half the pole pitch of either stator. The first pole teeth plates are identical. Each first plate has a first engaging portion cooperating with a second engaging portion of a stator housing fixedly connected to the second plate of the same stator to fix the relative angular positions of the components. On each first plate, the first engaging portion and the neighboring tooth of the same plate define an angle which is bisected by a line relative to which there are symmetrically disposed on the same plate at least two third engaging portions. In the assembled motor, the third engaging portions of one first plate congruently overly the third engaging portions of the other first plate.

10 Claims, 5 Drawing Figures

4,034,247

STRUCTURE FOR SYNCHRONOUS MOTOR, ESPECIALLY STEPPER MOTOR

BACKGROUND OF THE INVENTION

The invention relates to synchronous motors, of the type comprised of a pair of stators surrounding an armature having circumferentially successive armature poles of alternate polarity. In the type of motor in question, each stator is comprised of a first pole teeth plate and a second pole teeth plate, with the teeth of the first plate of each stator being interdigitated with the teeth of the second plate of the same stator and extending generally in axial direction of the motor, radially outwardly of the armature but radially inwardly of the stator winding. The angular spacing between a point on a pole tooth of the first plate of one stator and the corresponding point on the neighboring pole tooth of the second plate of the same stator constitutes one pole pitch. In the type of motor in question, the stators are arranged coaxial to each other, but offset relative to each other by half the pole pitch.

With motors of the type in question, the use of two stators angularly offset relative to each other by half the pole pitch creates the possibility that the motor armature per rotation will perform a number of steps twice as large as the number of pole teeth of a stator. With one known arrangement, the angular offset of the two stators relative to each other is established by using a housing which serves to receive the two stators. The housing is provided with grooves angularly offset relative to each other by half the pole pitch. The stators are provided with projections which are received in respective grooves, to thereby establish proper relative angular positions for the two stators.

SUMMARY OF THE INVENTION

It is a general object of the present invention to provide a construction for motors of the type in question which is particularly simple and economical and well-suited for mass-production, and which ensures proper establishment and maintenance of the half-pole-pitch angular offset between the two stators of the motor.

This object can be achieved by making the first pole teeth plates of the two stators exactly identical and arranging them back-to-back, and providing each first plate at its outer periphery with a first engaging portion, while providing each stator housing with a second engaging portion. The first engaging portion of each first plate cooperates with the complementary second engaging portion of the stator housing to establish the relative angular relationship between such first plate and such housing. On each first plate, the first engaging portion is angularly offset relative to the neighboring tooth of the same first plate by half the pole pitch. On each stator, the second engaging portion is angularly offset relative to the neighboring pole tooth of the second plate of the same stator by half the pole pitch.

Each first plate is furthermore provided with at least two third engaging portions. On each first plate, the first engaging portion and the neighboring tooth of the same plate together define an angle which is bisected by a line relative to which the third engaging portions of the same plate are symmetrically disposed.

When the two identical first plates are arranged back-to-back, with their respective third engaging portions congruently overlying each other in exact register, the first engaging portion of one first plate will be angularly offset relative to the first engaging portion of the other first plate by one half the pole pitch.

The first engaging portions of the first plates serve to properly establish the relative position of and to receive the remainder of each stator provided with the respective second plates; each stator may be comprised of an outer housing which is of one piece with the respective second plate. In this way, it is possible to assure that the pole teeth of each second pole teeth plate will be properly positioned angularly relative to the teeth of the associated first pole teeth plate, with its teeth centered in the spaces intermediate the teeth of the associated first pole teeth plate.

Advantageously, each first plate is provided with three engaging portions in the form of three cut-outs also serving to receive a connecting element, such as a nut and bolt connector. When three such cut-outs are employed, one of them will lie on the aforementioned bisecting line, which serves as a symmetry axis relative to the three cut-outs. An advantage of the indicated arrangement of the three cut-outs is that, during assembly, after flipping over one first plate and lying it back-to-back against an identical first plate, with the cut-outs of the two plates congruently overlying each other in exact regieter, it is possible to pass connectors through the aligned cut-outs, to thereby permanently establish in a very simple way the requisite angular offset between first engaging portion of one first plate and that of the other. In particular, it becomes possible to eliminate altogether, if so desired, the use of separate position-establishing means not forming an actual part of the finished motor structure.

According to a preferred concept of the invention each of the two stators is comprised of an external stator housing which is one piece with the second pole teeth plate of the same stator. An advantage of this expedient is that the angualr offset between the two stators is inherent in the design of the unassembled components of the two-stator motor.

To separate the magnetic circuits of the two stators it is advantageous to provide intermediate the annular central portions of the two first plates an intermediate ring of non-magnetic material.

In order to make it possible to make the teeth of the first pole teeth plates as long as desired, the pole teeth have the form of L-shaped bent projections. Each pole tooth is comprised of a first leg which is bent radially inwards and extends radially inwards from the outer periphery of the central portion of the plate generally parallel to such central portion, and a second leg which is bent up to extend generally normal to the central portion of the plate. Additionally, this manner of forming the pole teeth is characterized by optimal ruggedness and rigidity of the pole teeth. The free ends of the pole teeth line up with the inner circular periphery of the annular central portion of the respective pole teeth plate, through which the motor armature passes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
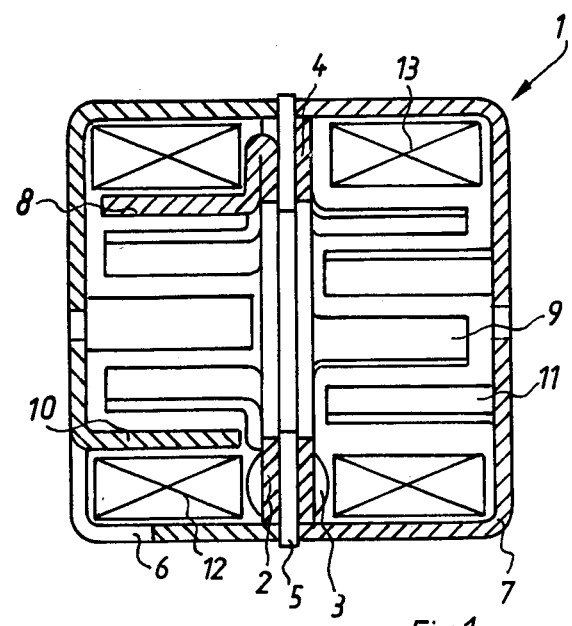
FIG. 1 is a longitudinal section taken through a motor of the type in question, with the armature thereof removed to reveal details of the construction of the stator.

FIG. 1 is a longitudinal section through a stepper motor 1 showing the basic construction in question. The motor 1 is comprised of two stators 2, 6 and 4, 7. Each stator is comprised of a respective first pole teeth plate 2 or 4 and of a respective second pole teeth plate 6 or 7. In FIG. 1, each stator 2, 6 and 4, 7 is provided with an exterior stator housing which, advantageously, is of one piece with the respective second pole teeth pole 6 or 7.

The two first pole teeth plates 2 and 4 of FIG. 1 are identical to each other, but arranged back-to-back, spaced apart by a non-magnetic annular plate 5 and connected together by means of a rivet connector 3. The first plate 2 of the left stator is provided with pole teeth 8, whereas the first plate 4 of the right stator is provided with pole teeth 9. The pole teeth 8 and 9 extend generally parallel to the axis of the motor 1.

In the constructions depicted in the drawing, each first plate 2 or 4 carries five pole teeth 8 or 9. Each pole tooth is of L-shaped cross-section and comprised of a first leg which is bent radially inwards and extends generally parallel to the central portion of the first plate 2 or 4, and a second leg which is bent out so as to extend generally axially of the motor 1.

In FIG. 1, the second plate 6 of the left stator is provided with five pole teeth 10, whereas the second plate 7 of the right stator is provided with five pole teeth 11. The pole teeth 8 of the first plate 2 of the left stator are interdigitated with the pole teeth 10 of the second plate 6 of the left stator, whereas the pole teeth 9 of the first plate 4 of the right stator are interdigitated with the pole teeth 11 of the second plate 7 of the right stator.

In each stator the pole teeth of the first plate 2 or 4 and also the pole teeth of the second plate 6 or 7 all lie on generally cylindrical surface approximately coincident with the circular inner peripheries of the back-to-back first plates 2 and 4. When the motor is in assembled condition, this cylindrical space will be occupied by the motor armature, which is not depicted in FIG. 1, in order to make as clear as possible the disposition of the parts of the various stator components. The motor armature will have north and south poles alternating around its periphery. The pole teeth 8, 10 of the left stator and 9, 11 of the right stator are located radially outwards of the armature and radially inwards of stator windings 12 and 13.

In each stator, the pole teeth of the respective first plate alternate with the pole teeth of the respective second plate. There are five pole teeth on the first plate and five pole teeth on the second plate, for a total of 10 pole teeth per stator. Accordingly, the pole pitch, i.e., the angular spacing between a point on a pole tooth 8 of one first plate 2 and a corresponding point on the adjoining pole tooth 10 of the second plate 6 of the same stator, will be equal to 36°.

In FIG. 1, which is provided to illustrate the basic structure of the type of motor in question, and to constitute a frame of reference for the illustrations in the other Figures, the two stators are provided with the aforementioned stator housing, which are generally cup-shaped and of one-piece with the second plates 6 and 7. Alternatively, it would be possible to dispense with the stator housings, or to use discrete stator housings separate from the second plates and surrounding and enclosing the latter.

An advantage of making the pole teeth plates 2 and 4 with L-shaped bent teeth as described above is that the axial length of the pole teach can be as great as desired; it is merely necessary to bend the radially outwardly projecting arms of the still flat, star-shaped pole teeth plate to the extent necessary to create pole teeth of the desired axial length. Also, the use of L-shaped bent pole teeth makes the pole teeth substantially independent of the diameter of the inner circular opening through which the permanent-magnet aramture of the motor must pass. The expedient in question furthermore makes for very good mechanical stability and ruggedness of construction.

Figure 3:
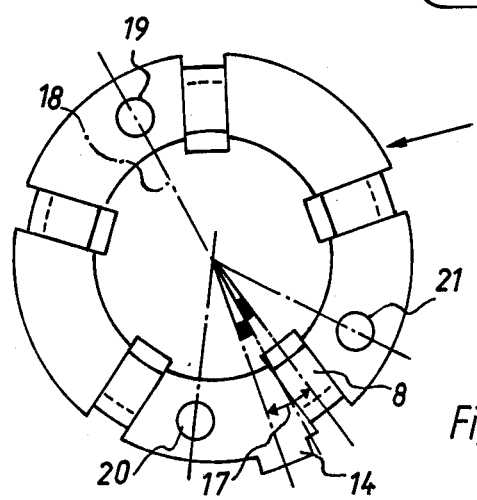
FIG. 3 depicts a first pole teeth plate, with the axially extending pole teeth projecting towards the viewer.

FIG. 3 depicts one design for the first plate 2. It will be understood that the other first plate 4 is exactly identical. In FIG. 3, the axially extending pole teeth 8 project towards the viewer. First plate 2 is provided at its outer periphery with a first engaging portion 14, here a radially outwardly extending projection. On first plate 2, the angular spacing between first engaging portion 14 and the neighboring pole tooth 8 of the same plate is designated by numeral 17 and is equal to half the pole pitch; it will be recalled that the pole pitch in the illustrated constructions is 36°, so that half the pole pitch is 18°. Accordingly, the angle 17 is also equal to one fourth the angle (72°) between two adjoining pole teeth 8 on the same plate 2. The other first pole plate 4 is identical to the first pole plate 2, but its respective first engaging portion is designated 15.

Figure 2:
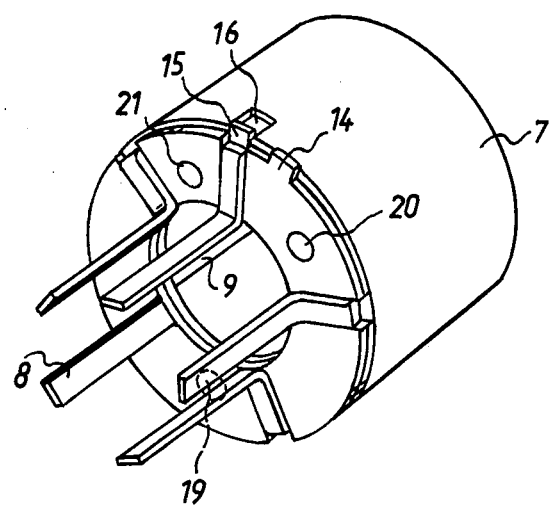
FIG. 2 is a perspective view of part of a motor similar to that of FIG. 3, with parts being removed to show the internal disposition of components.

FIG. 2 depicts part of the stator construction of a motor very similar to that depicted in FIG. 1. However, in FIG. 2, the intermediate non-magnetic annular plate 5 of FIG. 1 cannot be seen, and the left stator housing to which the second stator plate 6 of the left stator is fixedly connected is removed, to reveal the internal disposition of stator components.

The right stator housing 7, which because it is of one piece with the second plate 7 of the right stator is designated by the same numeral, is provided with a second engaging portion 16, here a cut-out of recess, complementary to the first engaging portion 15 of the first plate 4 of the right stator. The first engaging portion 15 of first plate 4 of the right stator is received in the complementary second engaging portion 16, thereby establishing the proper interdigitated realtionship between the pole teeth 9 (one partly visible in FIG. 2) of the first plate 4 and the pole teeth 11 of the second plate 7 of the right stator. It will be understood that the stator housing 6 now visible in FIG. 2 is provided with a similar second engaging portion complementary to and receiving the first engaging portion 14 of the first plate 2 of the left stator, thereby establishing the proper interdigitated relationsip betweeen the pole teeth 8 of the first plate 2 and the pole teeth 10 of the second plate 6 of the left stator.

It will be apreciated that the angular offset (18°) between the second engaging portion 16 of the right stator housing 7 and the neighboring pole tooth 11 of the second plate 7 of the right stator is equal to one half the pole pitch (36°); likewise, the angular spacing (18°) between the (non-illustrated) second engaging portion of the left stator housing 6 and the neighboring pole tooth 10 of the second plate 6 of the left stator is equal to one half the pole pitch (36°).

Returning to FIG. 3 and the illustration of an exemplary first pole teeth plate 2 therein, it will be noted that the first plate 2 is provided with three cut-outs or third engaging portions 19, 20 and 21. Cut-out or third engaging portion 19 lies on a line 18 which bisects the angle 17, i.e., which bisects the angle formed by the first engaging portion 14 of the first plate 2 and the neighboring pole tooth 8 of the same first plate 2. The three cut-outs or third engaging portions 19, 20, 21 are arranged symmetrically with respect to the bisecting line 18, which accordingly constitutes a symmetry axis for them. The angular spacing between each of the cut-outs or third engaging portions 20, 21 and the symmetry axis 18 is equal to the pole pitch (36°).

By establishing the aforedescribed angular spacings, it becomes very simple to reliably establish the angular offset between the two stators. One begins with two identical first plates 2 and 4. The first plate 4 for the right stator is flipped over and arranged back-to-back with the first plate 2 for the left stator. Then the cut-outs or third engaging portions 19, 20, 21 of the two first plates 2, 4 are brought into exact register. When such register is established, the pole teeth 8 of the first plate 2 for the left stator will be angularly offset by 18° relative to the pole teeth 9 of the first plate 4 for the right stator. Likewise, the angle between the first engaging portions 14 and 15 of the two first plates 2, 4 will be equal to 18°, i.e., half the pole pitch of 36°. Rivet connectors 3, or the like, are then used to effect a permanent connection between the two first plates 2, 4. The two first plates 2, 4 having been connected together in this way, they serve to establish definite angular positions for the stator housings and second plates 6, 7. The mounting of the stator housing 6, 7 is then very easily performed, and the stator housings 6, 7 can be identical, thereby reducing the number of different kinds of parts which must be kept on hand.

Figure 4:
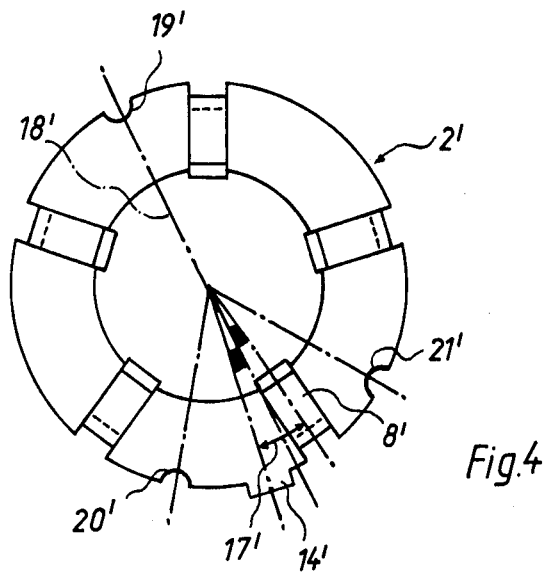
FIGS. 4 and 5 depict two further first pole teeth plates, again with the axially extending pole teeth projecting towards the viewer.

FIG. 4 depicts a first plate 2' in which the circular cut-outs or third engaging portions 19, 20, 21 of FIG. 3 are replaced by peripheral cut-outs of third engaging porions 19', 20', 21'. The bisecting line 18', the angle 17', the poletooth 9' and the first engaging portion 14' all correspond to similarly numbered parts in FIG. 3. Suitable connecting means or holding means can be used to engage the peripheral cut-outs f the two first plates 2', 4' to maintain them exactly congruent.

Figure 5:
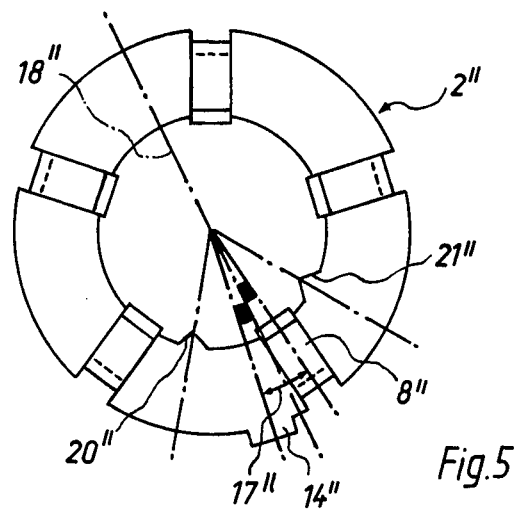

FIG. 5 depicts a first plate 2'' whose third engaging portions are radially inwardly extending projections 20'' and 21''. Suitable connecting means or holding means can be used to engage the projections 20'', 21'', to maintain the two first plates 2'', 4'' in congruently overlying relationship.

It will be understood that each of the elements described above, or two or more together, may also find a useful application in other types of constructions differing from the types described above.

While the invention has been illustrated and described as embodied in a synchronous motor, particularly a stepper motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a synchronous motor, comprising, a pair of stators surrounding an armature space each stator being provided with a respective stator winding, each stator being comprised of a first pole teeth plate, a stator housing and a second pole teeth plate with the teeth of the first plate of each stator being interdigitated with the teeth of the second plate of the same stator but not with the teeth of the other stator and extending generally in axial direction of the motor radially outwardly of the armature space but radially inwardly of the respective stator winding, the angular spacing between a point on a pole tooth of the first plate of one stator and the corresponding point on the neighboring pole tooth of the second plate of the same stator constituting one pole pitch, the stators being arranged coaxially but angularly offset relative to each other by half the pole pitch, the first plates being identical to each other and arranged back-to-back with the second plates being separated from each other by the two first plates, each first plate having at its outer periphery a first engaging portion, each stator housing having a complementary second engaging portion, the first engaging portion of each first plate cooperating with the complementary second engaging portion of the housing of the same stator to establish the angular relationship between such first plate and such stator housing, each first engaging portion on a first plate being angularly offset relative to the neighboring tooth of the same first plate by half the pole pitch, each second engaging portion on a stator housing being angularly offset relative to the neighboring tooth of the second plate of the same stator by half the pole pitch, each first plate having at least two third engaging portions, on each first plate the first engaging portion and the neighboring tooth of the same plate together defining an angle which is bisected by a line relative to which the third engaging portions of the same plate are symmetrically disposed, the third engaging portions of one first plate congruently registering with the third engaging portions of the other first plate, with the first engaging portion of one first plate being angularly offset relative to the first engaging portion of the other first plate by half the pole pitch.

2. The motor defined in claim 1, wherein the first engaging portions and the complementary second engaging portions are projections and cut-outs.

3. The motor defined in claim 1, wherein the first engaging portions are projections and wherein the second engaging portions are cut-outs complementary to the projections.

4. The motor defined in claim 1, wherein the third engaging portions are projections.

5. The motor defined in claim 1, wherein the third engaging portions are cut-outs.

6. The motor defined in claim 1, wherein the at least two third engaging portions of each first plate are three cut-outs.

7. The motor defined in claim 6, wherein one of the three cut-outs lies on the bisecting line.

8. The motor defined in claim 6, the motor further including connecting means passing through the congruently overlying cut-outs and holding the first plates together.

9. The motor defined in claim 1, wherein the teeth of each first pole teeth plate are formed of integral extensions of the central portion of the plate, with each integral extension being L-shaped and having a first leg bent radially inwardly so as to lie generally parallel to the plane of the central portion of the plate and having a second leg bent radially outwardly so as to extend generally normal to the plane of the central portion of the plate.

10. The motor defined in claim 1, wherein each stator housing is of one-piece with the second pole teeth plate of the respective stator.

* * * * *